United States Patent
Buñuel Magdalena et al.

(10) Patent No.: US 10,080,430 B2
(45) Date of Patent: Sep. 25, 2018

(54) METHOD FOR PRODUCING A DOMESTIC APPLIANCE PLATE AND DOMESTIC APPLIANCE DEVICE HAVING A DOMESTIC APPLIANCE PLATE

(75) Inventors: Miguel Angel Buñuel Magdalena, Saragossa (ES); Miguel Angel Caballero López, Saragossa (ES); Sara Ejarque Esteve, Alcañiz (ES); Francisco Javier Ester Sola, Saragossa (ES); Jose Francisco Fernandez Lozano, Colmenar Viejo (ES); Fidel Ferrando Molinos, Alcañiz (ES); Jose Ramon Garcia Jimenez, Augsburg (DE); Damaso Martin Gomez, Saragossa (ES); Fernando Planas Layunta, Saragossa (ES)

(73) Assignees: BSH Hausgeräte GmbH, Munich (DE); BSH Home Appliances Corporation, Irvine, CA (US)

( * ) Notice: Subject to any disclaimer, the term of this patent is extended or adjusted under 35 U.S.C. 154(b) by 1377 days.

(21) Appl. No.: 13/992,782

(22) PCT Filed: Dec. 14, 2011

(86) PCT No.: PCT/IB2011/055659
§ 371 (c)(1),
(2), (4) Date: Jun. 10, 2013

(87) PCT Pub. No.: WO2012/085763
PCT Pub. Date: Jun. 28, 2012

(65) Prior Publication Data
US 2013/0256295 A1 Oct. 3, 2013

(30) Foreign Application Priority Data
Dec. 21, 2010 (ES) .................................. 201031893

(51) Int. Cl.
*A47B 77/08* (2006.01)
*B28B 11/24* (2006.01)
(Continued)

(52) U.S. Cl.
CPC ................ *A47B 77/08* (2013.01); *B28B 3/20* (2013.01); *B28B 11/24* (2013.01); *C04B 35/195* (2013.01);
(Continued)

(58) Field of Classification Search
CPC . A47B 77/08; B28B 3/20; B28B 11/24; F24C 15/10
(Continued)

(56) References Cited

U.S. PATENT DOCUMENTS 3,379,570 A * 4/1968 Berger ................ H01M 2/1646
429/129
4,486,505 A * 12/1984 Fushiki .................. B32B 15/08
428/416
(Continued)

FOREIGN PATENT DOCUMENTS

CN 2304839 Y 1/1999
DE 10242481 C1 12/2003
(Continued)

OTHER PUBLICATIONS

Report of Examination EP 11 810 888.5 dated Mar. 8, 2016.
(Continued)

*Primary Examiner* — Dana Ross
*Assistant Examiner* — Kuangyue Chen
(74) *Attorney, Agent, or Firm* — Michael E. Tschupp; Andre Pallapies; Brandon G. Braun

(57) ABSTRACT

A method for producing a domestic appliance plate from a starting mixture. In order to provide a domestic appliance plate having a high resistance to thermal shock, good
(Continued)

thermal insulation, and advantageous mechanical properties, at least magnesium silicate hydrate, kaolinite, calcined kaolinite, and aluminum oxide are used for the starting mixture.

13 Claims, 2 Drawing Sheets

(51) Int. Cl.
  B28B 3/20 (2006.01)
  C04B 35/195 (2006.01)
  C04B 35/626 (2006.01)
  C04B 41/00 (2006.01)
  C04B 41/52 (2006.01)
  C04B 41/89 (2006.01)
  F24C 15/10 (2006.01)
  C04B 111/00 (2006.01)

(52) U.S. Cl.
  CPC ...... *C04B 35/6261* (2013.01); *C04B 35/6262* (2013.01); *C04B 35/62675* (2013.01); *C04B 41/009* (2013.01); *C04B 41/52* (2013.01); *C04B 41/89* (2013.01); *F24C 15/10* (2013.01); C04B 2111/00965 (2013.01); C04B 2235/3206 (2013.01); C04B 2235/3217 (2013.01); C04B 2235/3234 (2013.01); C04B 2235/349 (2013.01); C04B 2235/3418 (2013.01); C04B 2235/3445 (2013.01); C04B 2235/3463 (2013.01); C04B 2235/5436 (2013.01); C04B 2235/6021 (2013.01); C04B 2235/77 (2013.01); C04B 2235/9607 (2013.01)

(58) Field of Classification Search
  USPC ............ 219/452.12; 428/416; 429/129; 126/145; 501/98
  See application file for complete search history.

(56) References Cited

U.S. PATENT DOCUMENTS

| | | | |
|---|---|---|---|
| 4,634,841 A | 1/1987 | Laughrey | |
| 4,710,480 A * | 12/1987 | Buschmann | B32B 18/00 264/69 |
| 4,806,206 A * | 2/1989 | Kamijo | C04B 35/622 162/145 |
| 5,034,356 A * | 7/1991 | Brun | C04B 35/806 156/89.27 |
| 5,166,102 A | 11/1992 | Drouet et al. | |
| 5,344,799 A | 9/1994 | Wu | |
| 5,409,869 A * | 4/1995 | Ueno | C04B 35/581 257/E23.009 |
| 5,578,120 A * | 11/1996 | Takahashi | B41M 5/267 106/401 |
| 6,077,796 A * | 6/2000 | Beall | C04B 35/195 501/118 |
| 2009/0247389 A1 | 10/2009 | Watanabe et al. | |

FOREIGN PATENT DOCUMENTS

DE 102006035928 B3 2/2008
WO 2009053271 A1 4/2009

OTHER PUBLICATIONS

Report of Examination CN 201180062007 dated May 4, 2014.
International Search Report PCT/IB2011/055659 dated Mar. 9, 2012.
National Search Report ES 201031893 dated Mar. 23, 2012.

* cited by examiner

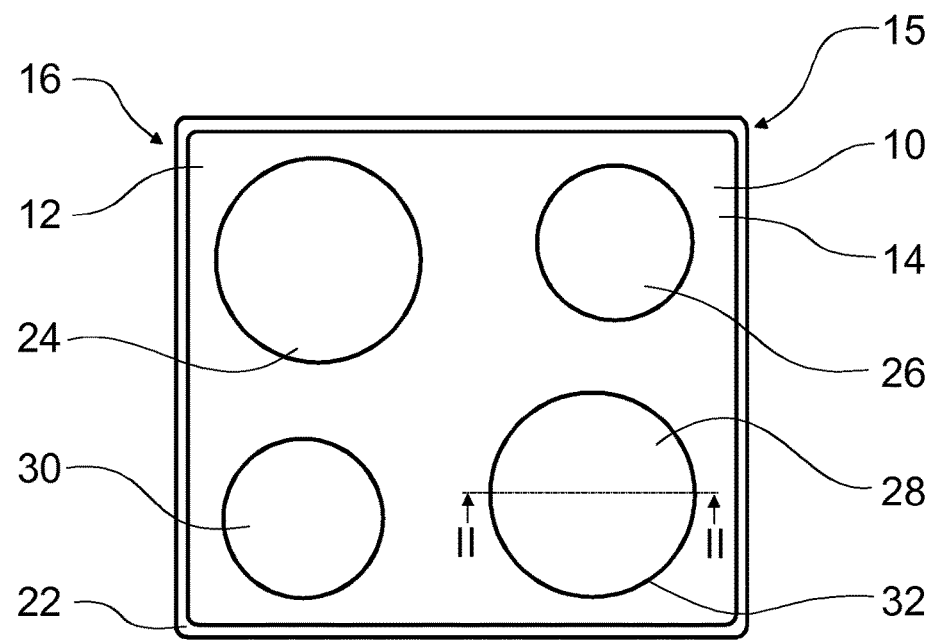
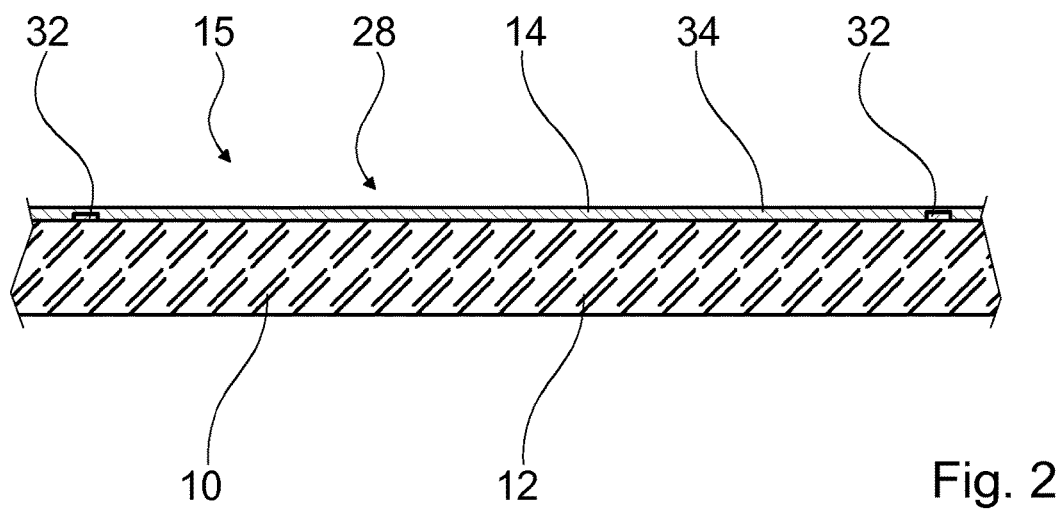

METHOD FOR PRODUCING A DOMESTIC APPLIANCE PLATE AND DOMESTIC APPLIANCE DEVICE HAVING A DOMESTIC APPLIANCE PLATE

BACKGROUND OF THE INVENTION

It is known to produce glass ceramic domestic appliance plates from a starting mixture that forms a glass melt in molten state.

BRIEF SUMMARY OF THE INVENTION

The object of the invention in particular consists in the provision of a domestic appliance plate with high thermal shock resistance, good thermal insulation and advantageous mechanical properties.

The invention relates to a method for producing a domestic appliance plate from a starting mixture.

It is proposed that at least magnesium silicate hydrate, kaolinite, calcined kaolinite and pure aluminum oxide be used for the starting mixture. A "starting mixture" should in particular be understood to mean a mixture of starting materials for a product. Preferably, the starting materials are present in the form of a powder and/or granules. "Calcined kaolinite" should in particular be understood to mean a material which is formed on the burning of kaolinite at at least 1000° C. In particular, the material is dewatered and comprises aluminum oxide and silicon dioxide. "Aluminum oxide" should in particular be understood to mean a chemical compound made of two aluminum atoms and three oxygen atoms. "Pure aluminum oxide" should in particular be understood to mean aluminum oxide in its pure form. The "pure form" of a material should in particular be understood to mean a mixture of materials containing the material with which the material has a mass fraction of at least 85%, in particular at least 90% and particularly advantageously at least 95%. Preferably, magnesium silicate hydrate with a mass fraction in a range of 30% to 50% is used in the starting mixture. Preferably, kaolinite with a mass fraction in a range of 10% to 20% is used in the starting mixture. Preferably, calcined kaolinite with a mass fraction in a range of 0% to 12% is used in the starting mixture. Preferably, in particular in addition to the aluminum oxide contained in the other starting materials of the starting mixture, pure aluminum oxide with a mass fraction in a range of 10% to 20% is used in the starting mixture. An embodiment of this kind enables a domestic appliance plate with high thermal shock resistance, good thermal insulation and advantageous mechanical properties to be created. In addition, it is possible to provide a cost-effective domestic appliance plate, in particular compared to a domestic appliance plate made of a glass ceramic. Moreover, the use of the domestic appliance plate as a hob plate in a hob, in particular in an induction hob, saves energy compared to a hob plate made of a glass ceramic since the thermal conductivity of the domestic appliance plate according to the invention is lower. This also enables additional heat input from hot cookware to electronic components of the hob arranged below the hob plate to be reduced so that a reduced cooling requirement enables a further reduction of costs. The ceramic appearance of the domestic appliance plate enables new design possibilities to be opened up. In particular, it is possible to adapt the appearance to kitchen furniture.

It is also suggested that ball clay is also used for the starting mixture to increase plasticity. "Ball clay" should in particular be understood to mean a sedimentary plastic clay, comprising kaolinite with a mass fraction of 20% to 80%, mica with a mass fraction of 10% to 25% and quartz with a mass fraction of 6% to 65%. Preferably, ball clay with a mass fraction in a range of 10% to 20% is used in the starting mixture. This can simplify subsequent extrusion.

Advantageously, high-purity synthetic cordierite is also used for the starting mixture. "Cordierite" should in particular be understood to mean a mineral from the silicate mineral class. "High-purity synthetic cordierite" should in particular be understood to be synthetically produced cordierite, which, with a mass fraction of at least 90%, in particular at least 95%, preferably at least 98% and particularly advantageously at least 99.9%, comprises a cordierite crystal phase. A "cordierite crystal phase" should in particular be understood to mean a crystal phase of cordierite, in particular an orthorhombic and/or a pseudohexagonal crystal phase. Preferably, the high-purity synthetic cordierite contains iron with a mass fraction of at the most 5%, in particular maximum 1% and particularly advantageously at the most 0.1%. Preferably, high-purity synthetic cordierite with a mass fraction of at the most 15% is used in the starting mixture. This enables nuclei to be introduced for crystal growth of a cordierite crystal phase in the starting mixture.

In a further embodiment of the invention, it is proposed that fireclay cordierite and/or aluminum titanate and/or coloring agents also be used for the starting mixture. "Fireclay cordierite" should in particular be understood to mean a synthetically produced material comprising cordierite and aluminum oxide, having aluminum oxide with a mass fraction in a range of 10% to 45%. A "coloring agent" should in particular be understood to mean a coloring substance, in particular a dye and preferably a pigment. "Dye" should in particular be understood to mean a coloring agent which is soluble in an application medium. A "pigment" should in particular be understood to mean a coloring agent which is insoluble in an application medium. Preferably, fireclay cordierite and/or aluminum titanate with a mass fraction of at the most 15% are used in the starting mixture. Particularly advantageously, high-purity synthetic cordierite and/or fireclay cordierite and/or aluminum titanate with a mass fraction of at the most 15% are used in the starting mixture. Preferably, coloring agents, in particular pigments and preferably natural pigments, with a mass fraction of at the most 5% are used in the starting mixture. This particularly advantageously enables the thermal shock resistance and/or thermal insulation of the domestic appliance plate to be increased. The addition of coloring agents enables advantageous optical effects to be achieved. In particular, it is easy to address special customer requirements with respect to color. In addition, it is possible to increase the recognition value of a domestic appliance.

It is also proposed that the starting mixture be kneaded into homogeneous paste. Preferably, the starting mixture is kneaded homogeneous paste with the addition of water. This enables a domestic appliance plate with as homogeneous properties as possible to be created.

In a particularly preferred embodiment of the invention, it is proposed that the homogeneous paste be extruded as a green sheet. "The homogeneous paste is extruded as a green sheet" should in particular be understood to mean that the homogeneous paste is pressed through a shaping orifice and cut to a desired length in order to assume the shape of the green sheet. Preferably, the green sheet is extruded horizontal and with the help of a vacuum. Preferably, the green sheet is extruded with a thickness of 2 mm to 5 mm. This enables quick shaping of the green sheet to be achieved in an automatable and reliable way.

It is also proposed that the method comprise at least one sintering process. A "sintering process" should in particular be understood to mean a deformation process in which components of the green sheet are jointed together by heating. Preferably, the green sheet is dried to remove water prior to the sintering process. Preferably, the green sheet is sintered at a temperature close to the melting point of the cordierite, in particular at a temperature in a range of 1200° C. to 1400° C. Preferably, the sintering process takes place in an oxidizing atmosphere. Preferably, the sintering process takes for a period of at least 2 h. Preferably, the sintering process takes place for a period of at the most 8 h. Preferably, calcination of the green sheet also takes place at the same time as the sintering. This enables the formation of a cordierite crystal phase in the green sheet to be initiated.

Also proposed is a domestic appliance device with a domestic appliance plate according to the invention, in particular a hob plate, which is produced by a method according to the invention. A "domestic appliance plate" should in particular be understood to mean a unit which is provided, in operational state, to cover at least one further unit of a domestic appliance, in particular at least a heating unit, and/or a functional chamber of a domestic appliance, in particular a cooking chamber, preferably toward the outside. "Provided" should in particular be understood to mean specially designed and/or equipped. This enables a cost-effective domestic appliance plate with high thermal shock resistance, good thermal insulation and advantageous mechanical properties to be created. In addition, a domestic appliance plate with a wide variety of colors can be created.

In a preferred embodiment of the invention, it is proposed that the domestic appliance plate have a mass fraction of 12% to 16% magnesium oxide, 30% to 35% aluminum oxide and 52% to 57% silicon dioxide. This facilitates high thermal shock resistance, good thermal insulation and advantageous mechanical properties.

In a particularly preferred embodiment of the invention, it is proposed that the domestic appliance plate substantially comprise a cordierite crystal phase. The fact that the domestic appliance plate "substantially comprises a cordierite crystal phase", should in particular be understood to mean that a mass fraction of at least 90%, in particular at least 95%, preferably at least 98% and particularly advantageously at least 99.9% comprises a crystal phase of the cordierite. This enables high thermal shock resistance, good thermal insulation and advantageous mechanical properties to be ensured.

Advantageously, the domestic appliance plate has a density of between 1.8 g/cm$^3$ and 2.4 g/cm$^3$. Preferably, the domestic appliance plate has a density between 1.9 g/cm$^3$ and 2.4 g/cm$^3$. This enables a domestic appliance plate to be created which is lighter than a domestic appliance plate made of a glass ceramic.

It is also proposed that the domestic appliance plate have a thermal shock resistance of at least 300 K. The fact that the domestic appliance plate has a "thermal shock resistance of at least 300 K", should in particular be understood to mean that the domestic appliance plate is designed to withstand a short-term temperature fluctuation of at least 300 K and in particular of at least 400 K. A "short-term temperature fluctuation" should in particular be understood to mean a temperature fluctuation lasting at the most 2 s, in particular maximum 1 s, preferably at the most 0.5 and particularly advantageously maximum 0.1 s. This enables it to be guaranteed that the domestic appliance plate functions reliably. It is also possible to enable the use of the domestic appliance plate as a hob plate.

In a further embodiment of the invention, it is proposed that the domestic appliance device comprise a protective layer, surrounding the domestic appliance plate at least partially. A "protective layer" should in particular be understood to mean a layer which is provided to protect the domestic appliance plate against mechanical stress, in particular abrasion, and/or chemical stress, in particular corrosion and/or the action of solvents and/or detergents. In particular, the protective layer has higher mechanical and/or chemical resistance than the domestic appliance plate. Preferably, the protective layer is also provided to compensate surface roughness of the domestic appliance plate. The fact that "a protective layer surrounds the domestic appliance plate at least partially" should in particular be understood to mean that the protective layer is at least partially arranged on an outer surface of the domestic appliance plate. An "outer surface" should in particular be understood to mean a surface which is penetrated by at least one beam emerging from a center of gravity of the domestic appliance plate, wherein the beam finally leaves the domestic appliance plate at a penetration point. Preferably, the protective layer is a vitreous enamel. This can provide effective protection of the domestic appliance plate. It is also possible for a surface of the domestic appliance plate to be smoothed thus enabling, on the one hand, the domestic appliance plate to be provided with a visual enhancement and, on the other, the amount of cleaning to be reduced.

Also proposed is a domestic appliance, in particular an induction hob, with a domestic appliance device according to the invention. The domestic appliance plate can generally be used in all household appliances that seem reasonable to the person skilled in the art, but in particular in induction hobs, ovens, dishwashers and in refrigerators. The use of a thermal-shock resistant kitchen worktop is also conceivable.

BRIEF DESCRIPTION OF THE DRAWINGS

Further advantages may be derived from the following description of the drawing. The drawing shows an exemplary embodiment of the invention. The drawing, the description and the claims contain numerous features in combination. The person skilled in the art will expediently also consider the features individually and combine them produce advantageous further combinations. The drawing shows:

FIG. 1 a top view of an induction hob with a domestic appliance device comprising a hob plate, FIG. 2 the domestic appliance device in a sectional view (not-true-to-scale) along a line II-II in FIG. 1 and FIG. 3 a flow diagram of a method for producing the hob plate.

DETAILED DESCRIPTION OF EXEMPLARY EMBODIMENTS OF THE PRESENT INVENTION

Figure 3:
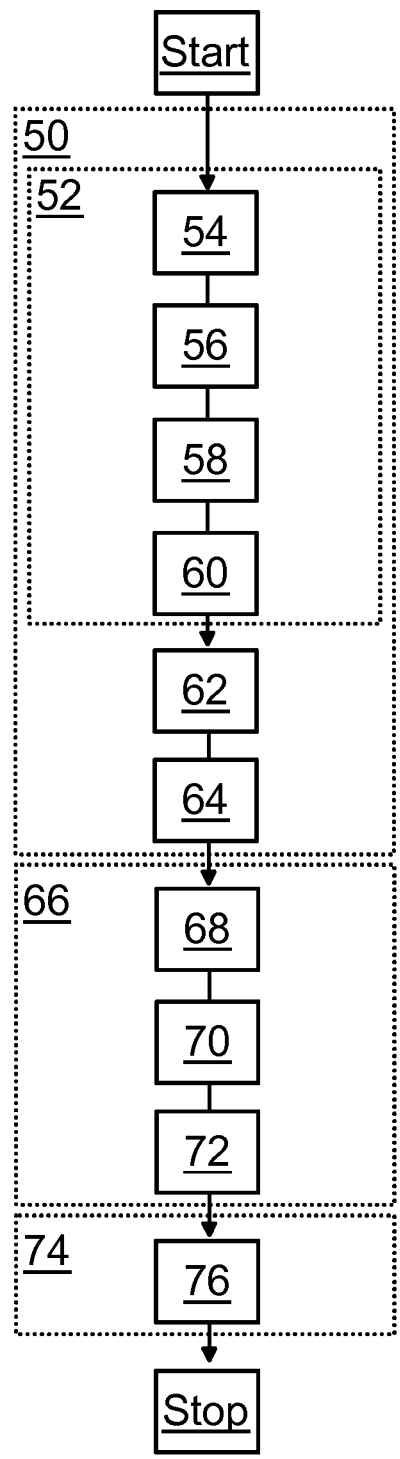

FIG. 1 shows a domestic appliance embodied as an induction hob 16 with a domestic appliance device according to the invention 15. The domestic appliance device 15 comprises a domestic appliance plate 10 embodied as a hob plate 12. The hob plate 12 is held in a frame 22 of the induction hob 16. On the hob plate 12, four heating zones are marked in known way 24, 26, 28, 30 by means of printing 32, which, in operational state of the induction hob 16, are provided for the placement of cookware. Beneath the hob plate 12, an induction heating element (not shown) is assigned to each of the heating zones 24, 26, 28, 30. The hob plate 12 is made of a cordierite-based synthetic aluminum magnesium silicate. The hob plate 12 has a mass fraction of 12% to 16% magnesium oxide, a mass fraction of 30% to 35% aluminum oxide and a mass fraction of 52% to 57% silicon dioxide. The hob plate 12 substantially comprises a cordierite crystal phase. The hob plate 12 has a density of 1.8 g/cm$^3$ to 2.4 g/cm$^3$. The hob plate 12 has a bending strength of 29 MPa to 69 MPa. In a temperature range of 25° C. to 300° C., the hob plate 12 has a mean coefficient of thermal expansion of $0.46 \times 10^{-6}$ K$^{-1}$ to $7.61 \times 10^{-6}$ K$^{\times 1}$. In a temperature range above 300° C. to 800° C., the hob plate 12 has a mean coefficient of thermal expansion of $2.34 \times 10^{-6}$ K$^{-1}$ to $6.90 \times 10^{-6}$ K$^{-1}$. The hob plate 12 has a thermal shock resistance of at least 400 K.

FIG. 2 shows a partial area of the domestic appliance device 15 in a section view (not-true-to scale) along a line II-II in FIG. 1. On the side facing the printing 32 on the heating zones 24, 26, 28, 30 and hence on the side provided for the placement of cookware, the hob plate 12 is covered by a protective layer 14. The protective layer 14 is transparent vitreous enamel 34a known to the person skilled in the art. The vitreous enamel 34 ensures that there is a smooth surface for accommodating cookware which is therefore also easy to clean. In addition, the vitreous enamel 34 protects the hob plate 12 from mechanical and/or chemical stresses.

The hob plate 12 is produced by means of a method as depicted in the flow diagram in FIG. 3. In one method section 50, a raw mixture for the hob plate 12 is produced. In a subsection 52 of method section 50, firstly high-purity synthetic cordierite is produced in order to provide crystallization nuclei for the formation of the cordierite crystal phase for a later sintering process. The method subsection 52 starts with a step 54. In step 54, kaolinite with a mass fraction of 70% to 80%, magnesium hydroxide with a mass fraction of at the most 12%, quartz and/or nano-silicates with a mass fraction of 10% to 20% and sodium tripolyphosphate with a mass fraction of 10% to 20% are mixed. Here, it should be noted that the mass fraction of alkaline earth metals is at the most 1% in order to avoid the formation of a liquid phase during subsequent calcination. The grain size of the materials used in step 54 is maximum 50 μm and advantageously at the most 20 μm. In a step 56, a mixture of materials obtained in step 54 is ground until a grain size of 1 μm to 5 μm is achieved. This is followed in a step 58 by the calcination the mixture of materials at 1200° C. to 1400° C. The calcination is performed for a period of maximum 4 h. After calcination, high-purity synthetic cordierite is obtained, which, in a step 60, is again ground to a grain size of 1 μm to 5 μm. This concludes method subsection 52.

In a step 62 of method section 50, the high-purity synthetic cordierite is added to a starting mixture. The starting mixture also comprises magnesium silicate hydrate with a mass fraction of 30% to 50%, kaolinite with a mass fraction of 10% to 20%, calcined kaolinite with a mass fraction of at the most 12% and pure aluminum oxide with a mass fraction of 10% to 20%. The starting mixture also comprises ball clay with a mass fraction of 10% to 20% to increase plasticity for subsequent extrusion. The starting mixture also comprises fireclay cordierite and aluminum titanate. The high-purity synthetic cordierite, the fireclay cordierite and the aluminum titanate together account for a mass fraction of at the most 15% of the starting mixture. The starting mixture also comprises natural pigments, for example copper oxide for coloration. Alternatively, it is also possible to do without the high-purity synthetic cordierite and/or the fireclay cordierite and/or the aluminum titanate and/or the pigments in the starting mixture. In a step 64, the starting mixture is kneaded in a screw kneading machine until a homogeneous paste is achieved. Optionally, it is possible to add water in order to increase the plasticity of the paste. This ends method section 50.

In a method section 66, a green sheet for the hob plate 12 is produced from the paste. In a step 68 of method section 66, extrusion is performed. To this end, the paste is pressed by means of a screw conveyer through a shaping orifice. The shaping orifice is largely rectangular. Alternatively, the shaping orifice can also have a shape different from a rectangle. In particular, the shaping orifice can be configured such that, on extrusion, a green sheet is formed which has a mounting flange. In order to counteract any deformation of the green sheet, the extrusion is performed horizontally. In addition, the extrusion is also supported by evacuation, so that the paste completely fills the space available to it in front of the shaping orifice of an extruder. The extrusion causes a green sheet with a thickness of 4 mm to be produced. In a step 70, the green sheet is dried at room temperature in ambient air for a period of 24 h to 48 h. For the complete removal of water, in a step 72, the green sheet is dried in a circulating oven under an air atmosphere at 145° C. for a period of 36 h. This ends method section 66.

In a method section 74, the hob plate 12 is produced. In a step 76 of method section 74, sintering the green sheet takes place. The sintering is performed at a temperature of 1200° C. to 1400° C. The sintering is performed in ambient air. The sintering is performed for a period of 2 h to 8 h. At the same time as the sintering, calcination of the green sheet also takes place. During the sintering and calcination, the cordierite crystal phase is formed in the green sheet. This finally produces the hob plate 12. This ends method section 74 and hence the method for producing the hob plate 12.

Finally, the printing 32 for marking the heating zones 24, 26, 28, 30 is applied to the hob plate 12 by means of a screen printing method. The protective layer 14 is also applied as vitreous enamel 34 on the side of the hob plate 12 provided for the placement of the cookware. Alternatively, the complete hob plate 12 can be covered with the protective layer 14. Alternatively, the printing 32 and/or the vitreous enamel 34 can also be applied to the dried green sheet before the sintering in step 76 in order then to be thermally treated together with the green sheet.

The invention claimed is:

1. A method for producing a domestic appliance plate comprising:
   a) providing a starting mixture of components comprising magnesium silicate hydrate, kaolinite, calcined kaolinite, and pure aluminum oxide;
   b) forming a green sheet from the starting mixture; and
   c) sintering the green sheet at an elevated temperature such that at least two of the components are joined together by heat.

2. The method of claim 1, further comprising adding ball clay to the starting mixture to increase plasticity.

3. The method of claim 1, further comprising adding high-purity synthetic cordierite to the starting mixture.

4. The method of claim 1, further comprising adding to the starting mixture at least one member selected from the group consisting of fireclay cordierite, aluminum titanate, and coloring agents.

5. The method of claim 1, wherein prior to step b), kneading the starting mixture into a homogeneous paste.

6. The method of claim 5, wherein step b) comprises extruding the homogeneous paste into the green sheet.

7. The method of claim 1, wherein the elevated temperature ranges from 1200° C. to 1400° C.

8. The method of claim 1, wherein the components are present in an amount of at least 50 wt. % based on the total weight of the starting mixture.

9. The method of claim 5, wherein the components are present in an amount of at least 50 wt. % based on the total weight of the homogenous paste.

10. A method for producing a domestic appliance plate comprising:
    providing a starting mixture of components comprising magnesium silicate hydrate, kaolinite, calcined kaolinite, pure aluminum oxide, and cordierite;
    sintering the mixture of components at a sintering temperature that is above the melt temperature of the cordierite.

11. The method of claim 10, wherein the starting mixture is a homogenous paste.

12. The method of claim 11, wherein the components are present in an amount of at least 50 wt. % based on the total weight of the homogenous paste.

13. The method of claim 10, wherein the sintering temperature ranges from about 1200° C. to 1400° C.

* * * * *